US 8,771,521 B2

(12) United States Patent
Boyd et al.

(10) Patent No.: US 8,771,521 B2
(45) Date of Patent: Jul. 8, 2014

(54) METHOD AND COMPUTER PROGRAM PRODUCT FOR TREATING LIQUID CONTAINING IMPURITIES

(75) Inventors: Brett H. Boyd, Coral Springs, FL (US); Russell L. Cook, Margate, FL (US); Adrian Streng, Hollywood, FL (US)

(73) Assignee: Parkson Corporation, Fort Lauderdale, FL (US)

( * ) Notice: Subject to any disclaimer, the term of this patent is extended or adjusted under 35 U.S.C. 154(b) by 670 days.

(21) Appl. No.: 12/848,864

(22) Filed: Aug. 2, 2010

(65) Prior Publication Data

US 2011/0168641 A1    Jul. 14, 2011

Related U.S. Application Data

(60) Provisional application No. 61/293,509, filed on Jan. 8, 2010.

(51) Int. Cl.
*C02F 1/00* (2006.01)
*B01D 24/32* (2006.01)
*G05D 7/00* (2006.01)

(52) U.S. Cl.
USPC ........ 210/741; 210/108; 210/416.1; 210/786; 210/808; 700/282; 700/271

(58) Field of Classification Search
None
See application file for complete search history.

(56) References Cited

U.S. PATENT DOCUMENTS

| 4,246,102 | A | | 1/1981 | Hjelmner et al. |
| 4,353,722 | A | * | 10/1982 | Berz ................................ 55/294 |
| 4,435,286 | A | | 3/1984 | Louboutin et al. |
| 4,676,914 | A | * | 6/1987 | Mills et al. .................... 210/741 |
| 5,252,230 | A | | 10/1993 | Dunkers |
| 5,468,397 | A | | 11/1995 | Barboza et al. |
| 5,582,722 | A | | 12/1996 | Wachinski et al. |
| 8,246,818 | B2 | | 8/2012 | Korzeniowski |
| 2003/0220717 | A1 | | 11/2003 | Underwood et al. |
| 2005/0077247 | A1 | | 4/2005 | Stedman |
| 2006/0081533 | A1 | | 4/2006 | Khudenko |
| 2011/0024369 | A1 | * | 2/2011 | Reekers ......................... 210/786 |
| 2011/0168615 | A1 | | 7/2011 | Boyd et al. |
| 2011/0168643 | A1 | | 7/2011 | Streng et al. |

OTHER PUBLICATIONS

Search Report and Written Opinion mailed Sep. 17, 2010 in International Appln No. PCT/US10/44161.

(Continued)

*Primary Examiner* — Nam Nguyen
*Assistant Examiner* — Richard Gurtowski
(74) *Attorney, Agent, or Firm* — Gilberto M. Villacorta; Jessica A. Flores; Foley & Lardner, LLP

(57) ABSTRACT

A method and a computer program product perform a backwash process, which facilitates a reduction in a reject rate associated with a water treatment tank. If a backwash process is needed, an upper burst solenoid is operated to start an airlift flow in a first airlift path at a first position and at a first point in time, at a bottom portion of the water treatment tank, and a lower burst solenoid is operated to start an airlift flow in a second airlift path at a second position and at a second point in time. The second position is below the first position and the second point in time is after the first point in time. The airlift flow in the first and second airlift paths enables suitable water flow within the water treatment tank.

18 Claims, 4 Drawing Sheets

(56) References Cited

OTHER PUBLICATIONS

Search Report and Written Opinion mailed Sep. 27, 2010 in International Appln No. PCT/US10/44103.

US Notice of Allowance in U.S. Appl. No. 12/848,842 Dtd Oct. 11, 2013.

US Notice of Allowance in U.S. Appl. No. 12/848,877 Dtd Nov. 21, 2013.

* cited by examiner

METHOD AND COMPUTER PROGRAM PRODUCT FOR TREATING LIQUID CONTAINING IMPURITIES

The present invention claims priority to U.S. Provisional Patent Application Ser. No. 61/293,509, entitled METHOD AND APPARATUS FOR TREATING LIQUID CONTAINING IMPURITIES, filed Jan. 8, 2010, which is incorporated in its entirety herein by reference.

BACKGROUND

The present invention relates to the treatment of a liquid containing impurities in which air bursts are provided to a water treatment tank via two air burst lines in order to reduce and/or eliminate filtrate turbidity spikes.

In connection with many municipal and industrial water treatment systems, water/wastewater needs to be purified. One example can be a drinking water system in which drinking water is produced from surface water. Another example may be a municipal wastewater treatment system in which the wastewater needs to be treated so that it can be discharged or reused for industrial, irrigational, or similar purposes.

Backwash upflow filters typically use airlifts in granular beds to stimulate the interaction between the granular beds and a liquid containing impurities to assist in separating the impurities from the liquid. Such filters typically do not have a device to detect and correct for the loss of airlift function. If the generated airlift stops lifting filter media, after a period of time the filter bed will become packed with feed solids. Eventually, "break though" will occur which will release excessive amounts of suspended solids into the filtrate, thus creating unacceptable filtrate quality. The detection of airlift failures conventionally requires physical observation by an operator, and manual efforts to correct the situation. Unfortunately, airlift failures are often not noticed and corrected for hours or even days, and the corrective actions, such as removal and replacement of the airlift and/or the media bed or labor intensive air lancing of the bed are required.

It is desired to provide a new and improved method and apparatus for the treatment of a liquid containing impurities, such as wastewater. For example, in the method and apparatus, the impurities and/or pollutants can be separated from the wastewater or other liquid in a granular media filter, such as a sand filter.

SUMMARY OF THE INVENTION

According to one embodiment of the present invention, a computer readable medium stores a computer program product for performing a backwash process, which facilitates a reduction in a reject rate associated with a water treatment tank, the computer program, when executed by a computer processor, causes the computer processor to perform the following functions:
  a) determining whether the water treatment tank is in need of a backwash process, and if so, performing the following functions:
    a1) instructing an upper burst solenoid to start an airlift flow in a first airlift path at a first position and at a first point in time, at a bottom portion of the water treatment tank;
    a2) instructing a lower burst solenoid to start an airlift flow in a second airlift path at a second position and at a second point in time, at a bottom portion of the water treatment tank, the second position being below the first position and the second point in time being after the first point in time; and
    a3) controlling a reject valve to control the reject rate, wherein the airlift flow in the first and second airlift paths enables suitable water flow within the water treatment tank.

According to another embodiment of the present invention, a method of facilitating reduction of a reject rate associated with a water treatment tank includes determining whether the water treatment tank is in need of a backwash process, and if so, performing the following functions:
  a1) starting an airlift flow in a first airlift path at a first position and at a first point in time, at a bottom portion of the water treatment tank;
  a2) starting an airlift flow in a second airlift path at a second position and at a second point in time, at the bottom portion of the water treatment tank, the second position being below the first position and the second point in time being after the first point in time; and
  a3) controlling a reject valve to control the reject rate, wherein the airlift flow in the first and second airlift paths enables suitable water flow within the water treatment tank.

It is to be understood that both the foregoing general description and the following detailed descriptions are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Various embodiments of the present invention will be explained with reference to the accompanying drawings.

Figure 1:
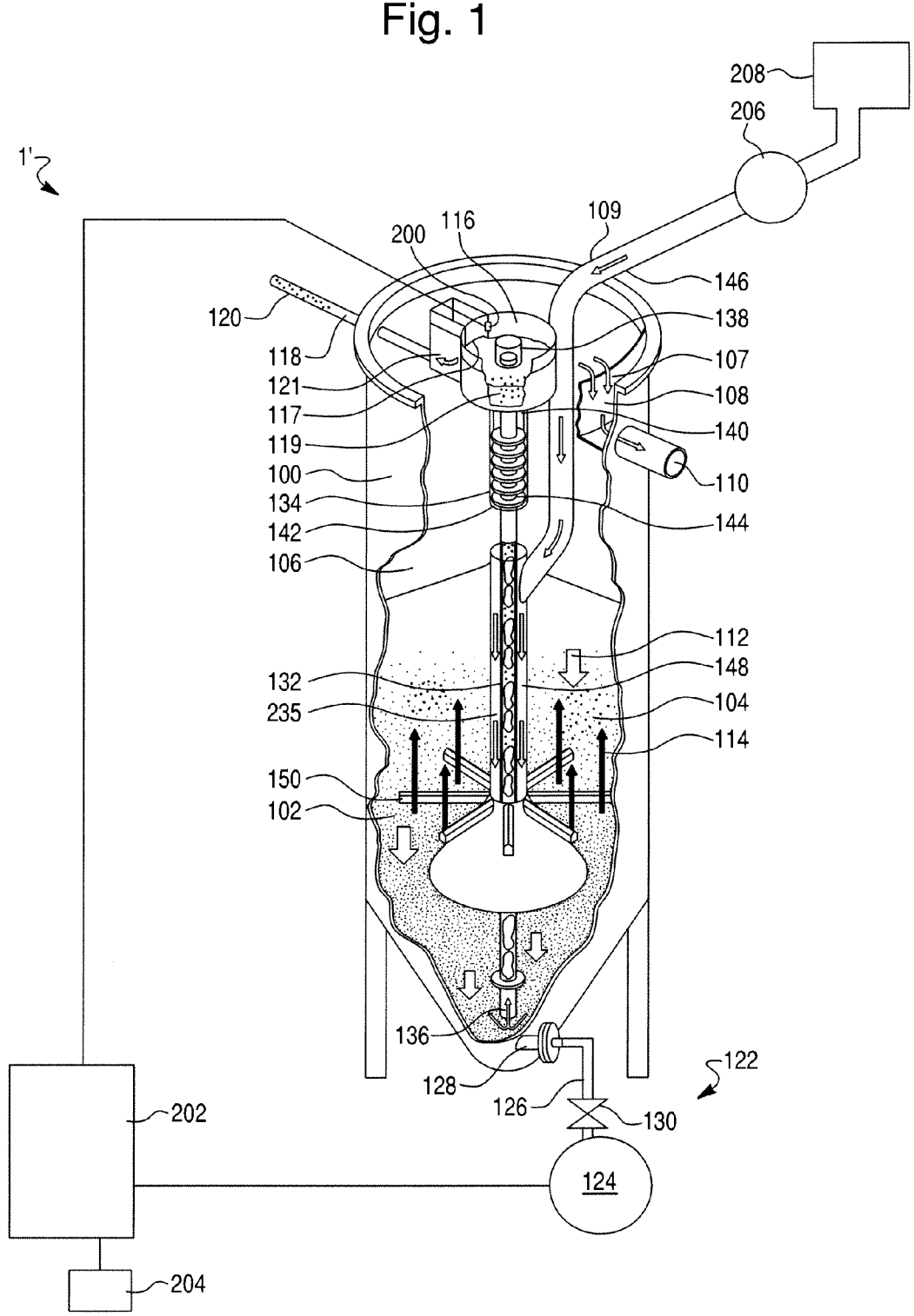
FIG. 1 shows a schematic drawing of an apparatus for treating a liquid containing impurities according to a related application.

FIG. 1 shows an apparatus 1 for treating a liquid containing impurities (for example, any undesired material) as described in a related provisional patent application Ser. No. 61/293, 509, which is incorporated in its entirety herein by reference. The apparatus 1 may be an upflow, deep bed granular media filter with continuous backwash. The liquid containing impurities (for example, wastewater) is introduced through an inlet 109 and channeled to below a portion of the granular media 104 (which can be, for example, sand) and into the filtering chamber 100. A bed of granular media 104 (which acts as the filtering medium) fills the filtering chamber.

The liquid containing impurities will rise upward in the filtering chamber 100 so that it flows through the granular media bed. The filtration of the liquid takes place as the granular media is traveling slowly downward in the filtering chamber 100 as indicated by arrow 112. Gas is also supplied to the airlift housing 132 near the bottom of the filtering chamber. The gas is introduced into the airlift housing 132, which will then contain a mixture of liquid, air and granular filter medium. The mixture of liquid, air and granular filter medium has a lower density than the surrounding liquid causing the mixture to rise in the airlift housing 132. As this mixture rises in the airlift housing, granular media and liquid near the bottom of the filtering chamber will flow into the airlift housing 132 such that the dirtiest of the granular media tends to flow into and upward in the airlift housing 132.

As the dirty granular media flows upward in the airlift housing, the granular media is subjected to a thorough mechanical agitation by the action of the gas bubbles within the airlift housing 132 and the impurities (such as, dirt or other undesirable material) is separated from the granular media. In order to further clean the particles or granular media, the media is washed in a granular media washer 134 which is located near the top end of the filtering chamber 100. The cleaned granular media from the granular media washer 134 is returned to the top of the bed of granular media 104 whereas the reject from the granular media washer 134 flows from the washer 104 to a reject section 116 so as to be discharged through the outlet 120. On the other hand, the treated liquid or filtrate flows into a filtrate section 108 and is discharged as an effluent through an outlet 110.

Using an upflow, deep bed granular media filter (such as the one in FIG. 1), the filter media may be cleaned by a simple internal washing system that does not require backwash pumps or storage tanks. The absence of backwash pumps has the advantage of low energy consumption. The granular media bed allows the apparatus to handle high levels of suspended solids and this heavy-duty performance may eliminate the need for pre-sedimentation or flotation steps in the treatment process in some applications. The granular media permits a substantial removal of the impurities from the liquid, such as up to 85, 90, 95, 99% or more, or any integer therebetween.

The details of the apparatus 1 in FIG. 1 will now be described. The apparatus 1 may comprise a filtering chamber 100 for accepting the liquid containing impurities, a filtrate section 108, a reject section 116, a gas supplying system 122, and a control unit 202.

The filtering chamber 100 includes a lower portion 102 in which granular media 104 removes the impurities from the liquid within the first inlet 109 to produce filtrate 106. The lower portion 102 is deemed lower because it is positioned within the lower half of the filtering chamber in a vertical direction. Although the filtering chamber 100 of FIG. 1 has a cylindrical shape, any suitable shape may be used, such as a chamber having a cross-section that is circular, rectangular, square, triangular, or other polygonal or non-polygonal shapes. The filtering chamber 100 may be in fluid communication with a first inlet 109 for the inflow of influent or liquid containing impurities.

The first inlet 109 may be in fluid communication with a liquid source 208 (such as a reservoir) which contains the liquid containing impurities. The liquid may be wastewater or water with impurities. A pumping system 206 can be used to channel the liquid from the liquid source 208 to the first inlet 109. The pumping system 206 may contain all the necessary equipment to initiate and maintain the fluid flow between the liquid source 208 and the filtering chamber 100, such as a pump, a control valve, and/or suitable piping/tubing. The first inlet 109 may comprise a feed pipe 146, an annular pipe 148, and radial pipes 150. The influent or liquid containing impurities is introduced at the top of the feed pipe 146 and flows downward through the annular pipe 148 around the airlift housing 132 (to be described later). The annular pipe 148 is sealed at its top end and is in fluid communication with the feed pipe 146 and the radial pipes 150 such that the liquid is introduced into the bed of the granular media 104 through the series of radial pipes 150 that are open or have individual openings along their longitudinal length on the sides facing the bottom of the filtering chamber 100 (that is, downward in FIG. 1).

Other configurations for the inlet are contemplated. For example, alternative structures than what is shown in FIG. 1 may include one or more of the following structures: the feed pipe 146 may be directly connected to the radial pipes 150 without the annular pipe 148, the radial pipes 150 may be opened at their distal ends, the radial pipes 150 may have outlets along their circumferential surfaces in the form of one or more holes along their bottom surfaces, the radial pipes may simply be U-shaped structures with their open ends facing downward, a pipe running parallel to the airlift housing 132 may be used instead of the annular pipe 148, and/or the feed pipe 146 may enter the filtering chamber near the bottom or towards the center of the filtering chamber instead of at the top.

The granular media 104 may be sand and may create any suitable size of bed, such as a 40" wide bed or a 80" wide bed. Further, the bed may be any suitable depth. Suitable depths may include, for example, 1, 2, 3, 4, 5, or more meters, and may also include less than 1 meter depths.

The granular media 104 in the filtering chamber can descend in a downward direction as indicated by the arrow 112 and the liquid 106 in the filtering chamber 100 can flow in an upward direction such that the impurities are removed from the liquid by impacting the granular media 104 to produce filtrate at the top of the bed of granular media 104. Indeed, the filtration of the liquid takes place as the granular media 104 is traveling slowly downward in the filtering chamber 100 as indicated by arrow 112. The slow downward movement of the granular media in the bed is caused by a gas being sent up by a gas supplying system 122.

The filtrate section 108 may be in fluid communication with the lower portion 102 of the filtering chamber 100 for receiving the filtrate that has passed through the granular media 104. The filtrate section may be an open end container, enclosure, or any suitable fluid containing structure. According to one possible implementation, the filtrate section 108 comprises a weir 107. The filtrate that has emerged at the top portion of the filtering chamber 100 pours over the weir 107 and into the filtrate section 108. The filtrate section 108 may be in fluid communication with a first outlet 110 for the outflow of effluent or the filtrate. The first outlet 110 may be piping, tubing, or connections in which piping or tubing may be connected.

The reject section 116 may be in fluid communication with the lower portion 102 of the filtering chamber 100 for receiving a reject mixture 138 containing granular media and impurities. The reject section 116 may be an open end container, enclosure, or any suitable fluid containing structure. The fluid communication can be configured such that the reject section 116 is in fluid communication with the airlift housing 132. The airlift housing 132 is a structure, such as a cylindrical pipe or tube, that may run through the center of the filtering chamber 100 and inside the annular pipe 148. As the granular media 104 in the filtering chamber 100 descends in the downward direction 112 such that the impurities are removed from the liquid by the granular media 104, near the bottom of the filtering chamber 100, a small volume of compressed gas, such as air, nitrogen, oxygen, or the like, is introduced at the bottom of the filtering chamber 100 by the gas supplying system 122 so as to draw the granular media into the airlift housing 132 at the bottom end 136 of the airlift housing 132. Scouring inside the airlift housing 132 dislodges any solid particles attached to the granular media. The reject mixture of granular media and dislodged impurities (which may form a dirty slurry) is pushed to the top end 138 of the airlift housing 132 and into the reject section 116.

The reject section 116 may comprise an inlet section 119 and an outlet section 121 that are isolated from each other by a weir 117. The reject mixture that has emerged from the airlift housing 132 at the top end 138 of the airlift housing 132 fills up the inlet section 119 of the reject section 116 until a portion of the reject mixture pours over the weir 117 into the outlet section 121 of the reject section. The outlet section 121 of the reject section 116 may also be in fluid communication with a second outlet 120 for the outflow of the portion of the reject mixture 118 that has poured over the weir 117. The second outlet 120 may be a piping, tubing, or a connection in which piping or tubing may be connected.

As seen in FIG. 1, the inlet section 119 of the reject section 116 also is in fluid communication with a granular media washer 134. The granular media washer has a granular media inlet 140, a granular media outlet 142, and concentric stages 144. From the reject section 116, the heavier granular media 104 falls into the granular media washer 134 via the granular media inlet 140 and the lighter reject solids that were dislodged from the granular media flow are eventually poured over the weir 117 and out the second outlet 120. The granular media 104 cascades down through the concentric stages 144 of the granular media washer 134. The concentric stages 144 may simply comprise spiral flights around the airlift housing 132. As the granular media is cascading down the concentric stages, it encounters a small amount of filtrate moving upward through the washer 134 from the granular media outlet 142. This filtrate in the washer 134 is driven by the difference in liquid level between the filtrate pool in the filtering chamber 100 and the reject section 116. The heavier, coarser granular media flows through this small counter current flow while the remaining impurities are carried back up to the reject section 116. The washed granular media returns to the filtering chamber 100 and is deposited on the top of the granular media bed where it once again begins the influent cleaning process and its eventual migration to the bottom of the filtering chamber 100.

The gas supplying system 122 may be provided for delivering gas to the granular media 104 in the filtering chamber 100 to provide lift to the granular media 104 to stimulate interaction among the granular media 104, the liquid 106, and the impurities to facilitate the removal of the impurities from the liquid. The gas supplying system 122 may comprise a gas source 124, a gas line 126 in fluid communication with the gas source 124, and a gas inlet (not shown) attached to the filtering chamber 100 and in fluid communication with the gas line 126 and the lower portion 102 of the filtering chamber 100. The gas source 124 may be a fan, a gas pump, a pressurized cylinder of gas, or some other suitable source of gas. The gas source may also be within the housing of the filtering chamber 100 or the gas source 124 may be directly connected to the gas inlet 128. The gas being introduced into the filtering chamber 100 by the gas source 124 may be air, nitrogen, oxygen, or some other suitable gas. A control valve 130 may be optionally used to control the gas flow and/or pressure from the gas source 124 to the lower portion 102 of the filtering chamber 100. Also, an optional distribution plate (not shown) may be located near the bottom of the filtering chamber 100 so as to control the distribution of the gas through the granular media 104. Still further, an optional drain 128 may be provided at or near the bottom of the filtering chamber 100.

As used herein, the term "airlift" is meant to encompass lift caused by gas delivery by the gas supplying system regardless of the type of gas used. In other words, "airlift" encompasses lift by any suitable gas, such as nitrogen, oxygen, or other suitable gases beside air.

A sensor 200 may be provided for determining a level of reject mixture in the reject section 116, or a flowmeter to determine the amount of reject flow in the reject section 116, and a control unit 202 may be provided to control the gas supplying system 122 and to receive one or more signals from the sensor 200. Typically, when an airlift stops lifting the filter media, the reject flow rate increases. A lack of airlift prevents the granular media from being drawn into the airlift housing 132 at the bottom end 136 of the airlift housing 132 and entering the reject section 116. The airlifted media grains falling down through the concentric stages 144 of the granular media washer 134 usually restrict the upward flow of the wash liquid (the wash liquid being clean filtrate below the granular media washer 134 that becomes reject liquid as it moves upward through the concentric stages 144 of the granular media washer 134 scouring the dirt and impurities from the falling filter media). If there is less or no granular media in the reject section 116 that can fall through the granular media washer 134, there is no falling media to restrict the upward rise of the wash liquid through the granular media washer 134; thus causing more than normal fluid flow into the reject section. As a result, the reject flow rate increases when the airlift stops its normal functioning. Thus, the amount of reject mixture is increased in the reject section, and particularly in the outlet section of the reject section. Although the following description places the sensor in the outlet section 121 of the reject section 116, the sensor 200 can alternatively be placed in the inlet section 119 of the reject section 116.

The combination of the sensor and control unit can be configured to effectively and continuously determine the depth of the liquid collecting in the reject section 116 at the outlet section 121. According to one possible implementation, the sensor and control unit will effectively and continuously determine the depth of the liquid flowing over the reject section weir 117 into the outlet section. The sensor may be an ultrasonic level transducer sensor that is attached to one of the walls of the reject section 116 above the reject section weir 117 in the outlet section 121 of the reject section 116 or attached to the weir 117 itself. An example of a suitable sensor may be an 18 mm diameter cylindrical analog output ultrasonic sensor from Pepperl+Fuchs, model number UB300-18GM40-I-V1. Such a sensor can provide a 4-20 mA output, which can be scaled into the control unit. If the sensor 200 is attached to the weir 117 itself, such as by bracket 210 in FIG. 2, there is an advantage that, if an operator should raise or lower the height of the reject section weir 117, the reference distance between the sensor 200 and the top of the reject section weir 117 is not effected by the change in the height of the weir 117.

The control unit 202 may be in communication, for example electrical contact, with the gas source 124 and/or the gas valve 130 to control the amount of gas being released from the gas supplying system 122 into the filtering chamber 100. The control unit 202 also in communication, for example electrical contact, with the sensor 200 so as to receive signals from the sensor and process the received signals to determine the amount of reject mixture in the reject section 116. The sensor may can be scaled into the control unit to continuously read the current reject mixture depth in the outlet section 121 adjoining the reject section weir 117. From the determined amount of reject mixture in the section, the control unit 202 is then configured to determine if the granular media is being lifted appropriately by an appropriate lift being provided by the gas supplying system.

According to structure shown in FIG. 1, the control unit 202 is configured to determine whether the appropriate lift is being provided by comparing a sensor reading from the sensor 200 to a predetermined threshold. An "appropriate lift" can be the amount of lift provided by the gas supplying system to the bed of granular media such that the release of excessive amounts of suspended solids into the filtrate (that is, breakthrough) is avoided. Examples of appropriate lift can include operation of the gas supplying system such that a pressure differential between the top and bottom of the bed of granular media is within a predetermined range (such as 10, 15, 20, 30 psi or any integer therebetween), or such that a predetermined percentage of granular media (such as 5, 10, 20, 25, 30% or any integer therebetween) remains in motion.

The control unit may be configured to determine that an appropriate lift is not being provided by the gas supplying system 122 when a level of the reject mixture in the outlet section 121 of the reject section 116 is above a predetermined threshold. The threshold may be some predetermined distance from the sensor. According to one possible implementation, the threshold may be a vertical distance from the sensor to an acceptable level of reject mixture in the outlet section 121 that is below the top of the weir 117 or the like. The control unit 202 also can be configured to operate the gas supplying system 122 to provide repeated gas bursts to the granular media in the filtering chamber 100 for a predetermined time period if an appropriate lift is not being provided by the gas supplying system 122. Alternatively or additionally, the control unit 202 can be configured to operate the gas supplying system 122 to provide repeated gas bursts to the granular media in the filtering chamber for a predetermined plurality of time periods if an appropriate lift to the granular media is not being provided by the gas supplying system 122. The operation of the gas supplying system 122 may be controlled by the control unit through operation of the gas control valve 130 and/or the operation of the gas source 124 (for example, if the gas source 124 is a gas pump).

If the appropriate lift is not being provided by the gas supplying system 122 after the corrective measures taken by the control unit 202 (for example, after the gas supplying system has provided repeated gas bursts to the granular media in the filtering chamber for the predetermined plurality of time periods), the control unit may be configured to operate an alarm 204.

The control unit 202 may be constituted by a microcomputer comprising a central processing unit (CPU), a read-only memory (ROM), a random access memory (RAM), an input/output interface (I/O interface), a counter, and one or more timers. Alternatively or additionally, the controller may be constituted by a plurality of microcomputers. The control unit 202 comprises the necessary hardware and/or software to carry out its functions disclosed herein.

The structure shown in FIG. 1 may execute at least the following steps. The control unit 202 detects a non-functioning airlift within a time period, for example seconds, of the occurrence by comparing readings from the sensor 200 to one or more thresholds. The control unit 202 then immediately initiates corrective actions to regain the proper airlift function, such as within 1, 2, 3, 4, or more seconds. After a specified wait time (for example, one, two, three, four, or more minutes), if the airlift had not regained proper functioning, the corrective actions will be repeated. These steps will be repeated a specified number of times (for example, two, three, four, five, or more times). If the airlift function is not reestablished after these repetitions, the alarm 204 will be triggered to summon physical attention from an operator. The alarm may be an audible alarm and/or a visual alarm.

Figure 2:
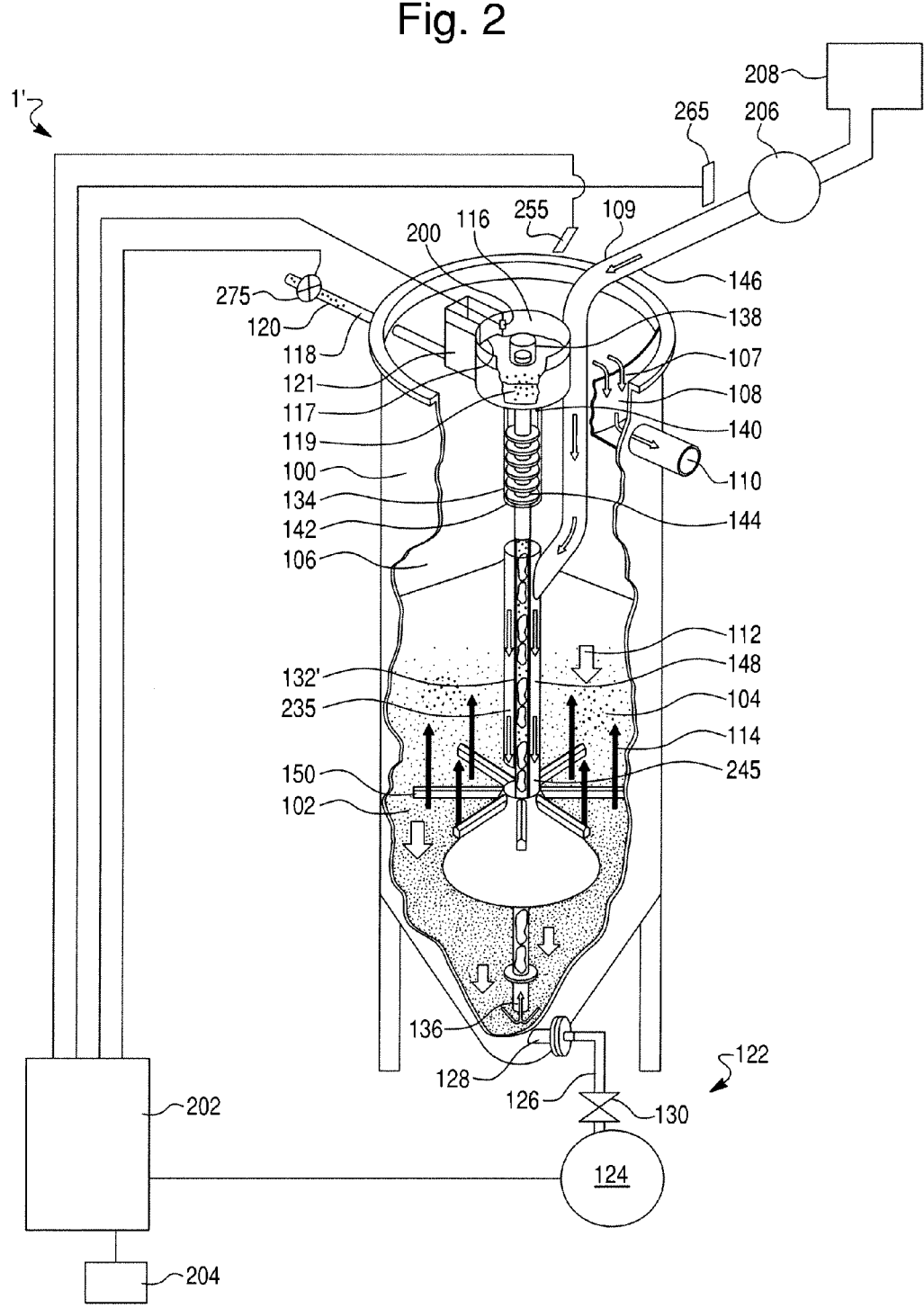
FIG. 2 shows a schematic drawing of an apparatus for treating a liquid containing impurities according to an embodiment of the invention.

An embodiment of a water treatment unit 1' according to the invention is described hereinbelow with reference to FIG. 2. In this embodiment, an airlift housing 132' has an upper air supply line 235 and a lower air supply line 245, instead of only a single air supply line as provided in the airlift housing 132 in the structure shown in FIG. 1. The two air supply lines are provided in order to overcome problems associated with airlift bottom blowout. Airlift bottom blowout occurs due to compaction of sands and solids within the airlift, causing a portion of the air burst to discharge out of the bottom of the airlift, rather than all exiting out of the top of the airlift, as is desired. By having two separate air supply lines in accordance with this embodiment, air released into the filter bed will lessen the effect of solids being scoured from the media and released into a filtrate pool at the top of the water treatment device, so as to improve filtrate quality.

Also, in this embodiment, a sensor 255 is positioned directly above the weir 117 of the reject section 116, in order to detect whether or not sufficient filter media movement occurs in the water treatment tank. Further, in this embodiment, a pressure transducer 265 is provided above the feed inlet 109, in order to determine the current headloss for the water treatment tank. Still further, an automatic valve 275 is provided on the outlet 120 of the reject section 116, whereby the automatic valve 275 is opened and closed at particular time, in order to reduce and/or eliminate the increase in contaminant levels which usually occur during restarting of reject flow from the water treatment tanks. A control unit 202' receives information from the sensor 255 and the pressure transducer 265, and controls operation of the automatic valve 275. In all other respects, the control unit 202' is similar to the control unit 202 as shown in FIG. 1.

In more detail, when users have attempted intermittent airlift operation for a water treatment unit such as a Dyna-Sand™ Filter, in order to perform a backwash operation to clean the water treatment unit, those users have sometimes experienced an unacceptably high turbidity spike immediately after the air burst start-up. Due to the volume of the filtered water at the top of the water treatment unit, it would generally take a while for the after-effect of the spike to pass, which can be on the order of 30 minutes or more. This is an unacceptable problem, and the use of upper and lower airlift lines as described in this embodiment operates to overcome this problem.

In this embodiment, a second air supply line is provided to each airlift, whereby the upper air supply line is located two feet above the elevation of the lower air supply line. One of ordinary skill in the art will recognize that other elevation distances between the upper and lower supply lines may be envisioned while remaining within the spirit and scope of the invention (e.g., 6" to 3' elevation difference). By programming an air control panel to first send an airburst to the upper elevation supply line, and then having a burst sent to the lower elevation supply line, the resistance will be less for all of the air, which will allow the air bursts to rise up through the airlift to the top of the water treatment unit. This way, disruptive blast of air out of the bottom of the airlift will be eliminated and/or minimized as compared to single air supply line water treatment units.

Figure 3A:
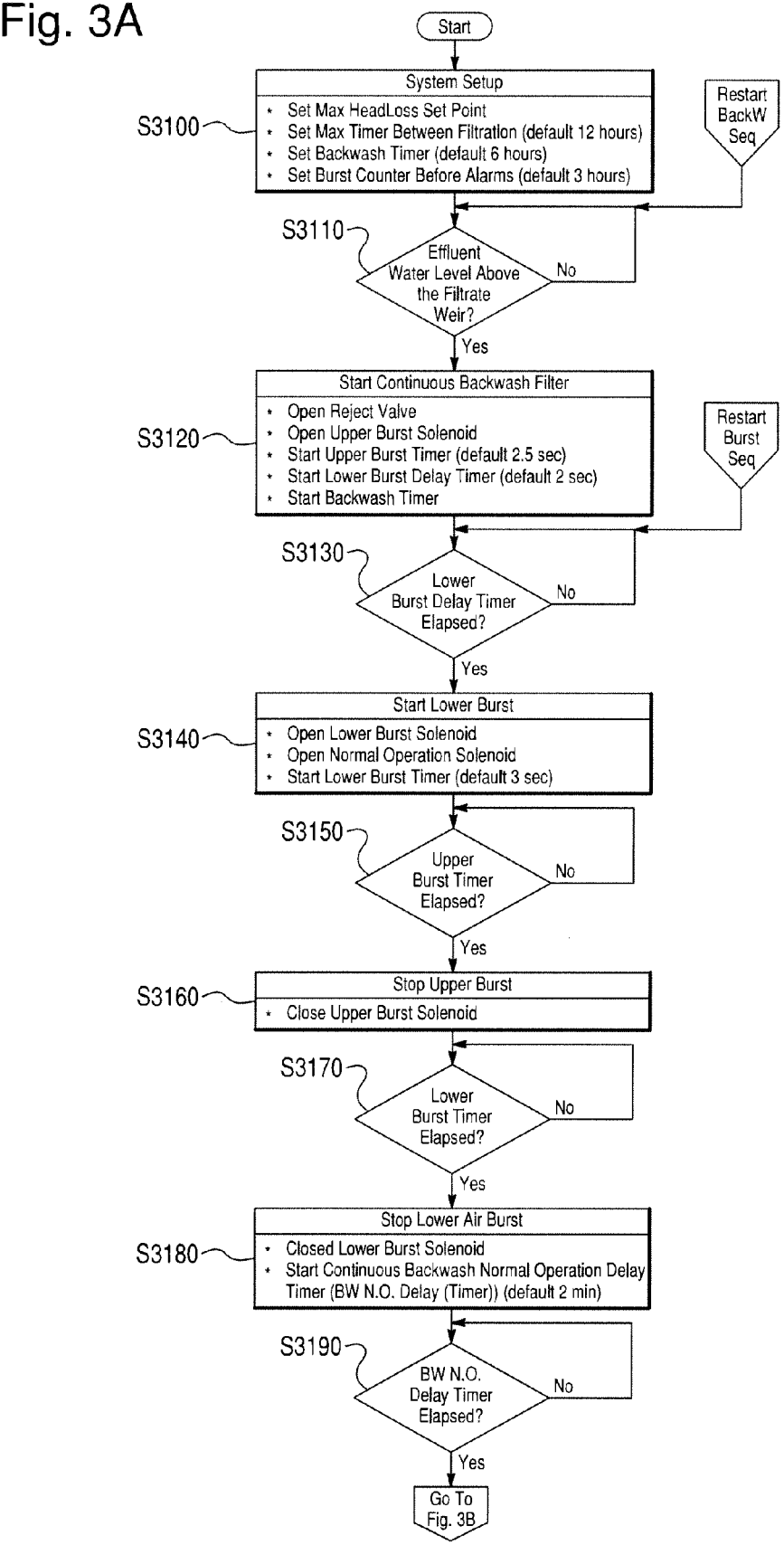
FIGS. 3A and 3B show a control method for treating a liquid containing impurities according to an embodiment of the present invention.
Figure 3B:
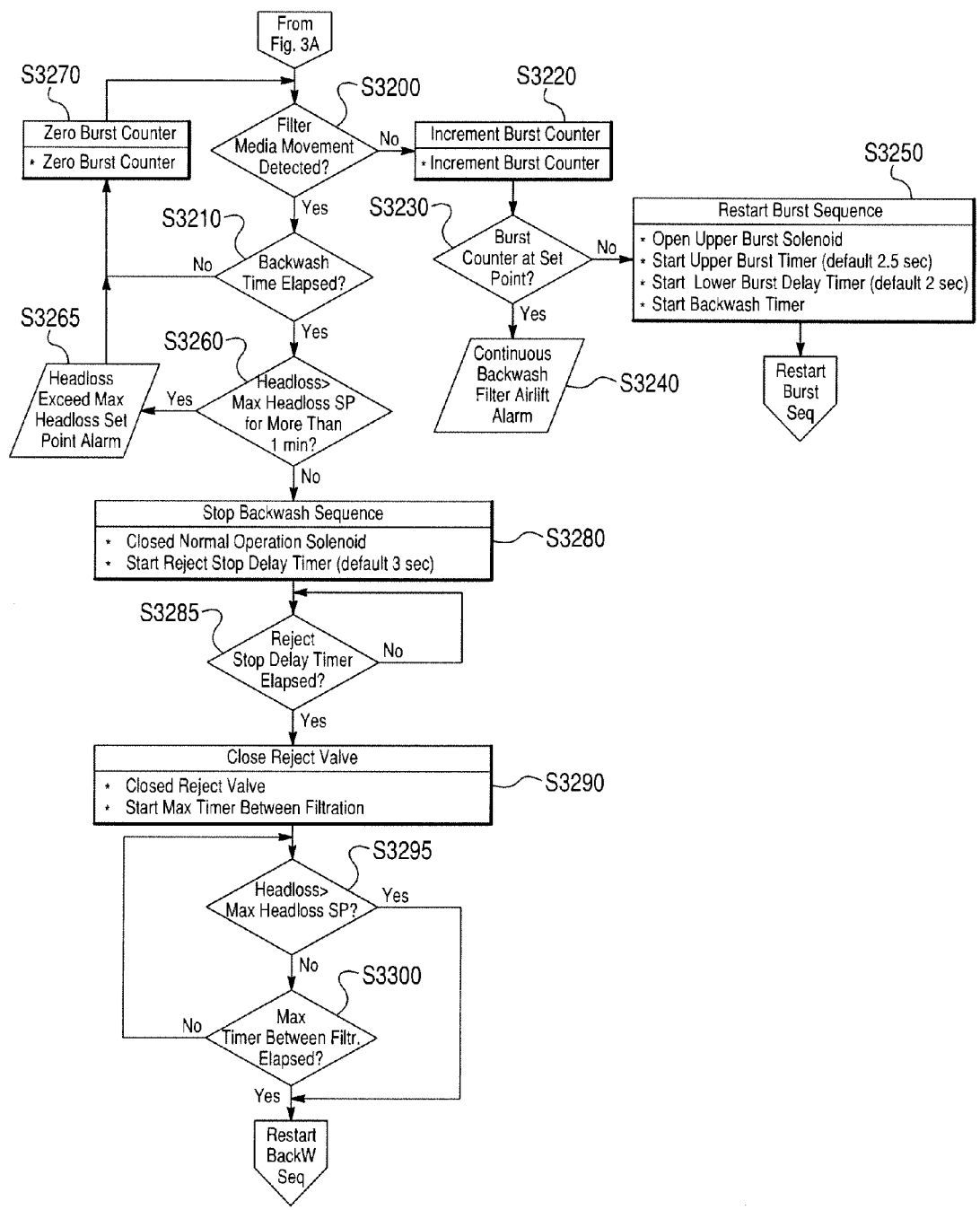

Reference is now made to FIGS. 3A and 3B, which correspond to a flowchart showing the operation of a control (e.g., performed by a computer running a computer program stored on a computer readable medium such as a compact disc), for providing the airbursts to provide for a better (e.g., lower)

reject rate as compared to conventional water treatment units. In step 3100, system setup is performed, whereby values are set for the maximum headloss (max_headloss_set_point, default of 30 to 36 inches of water pressure for 2 meter tank, default of 24 to 30 inches of water pressure for 1 meter tank, with a min value of 10 inches and a max value of 48 inches), the maximum time between filtration (e.g., default 12 hours, min 1 hr, max 48 hrs), the backwash timer (e.g., default 6 hours, min 30 minutes, max 12 hrs), and the burst counter before alarms (e.g., default 3, min 2, max 10). These values are set by an operator of the water treatment unit, and can be entered via a computer keyboard or mouse, or by other input mechanisms.

In step 3110, a determination is made as to whether or not the effluent water level in the tank 100 is above the filtrate weir. If No, then the system is not required to operate, and the process flow loops back to the start of step 3110 (this determination is made periodically, such as every 10 seconds). If Yes, then the process flow goes to step 3120, to start continuous backwash filtering. In step 3120, the reject valve is opened, an upper burst solenoid is opened (to enable air to flow into the upper elevation supply line), an upper burst timer is started (default 2.5 seconds, min 1 second, max 10 seconds), a lower burst delay timer is started (default 2 seconds, min 1 second, max 10 seconds), and a backwash timer is started.

In step 3130, a determination is made as to whether or not the lower burst delay timer has elapsed. If No, the process flow loops back to the start of step 3130 (this determination is made periodically, such as every 10 milliseconds). If Yes, then the process flow goes to step 3140, to start the lower air burst. In step 3140, the lower air burst solenoid is opened (to enable air to flow into the lower elevation supply line), a normal operation solenoid is opened, and a lower burst timer is started (default 3 seconds, min 1 second, max 10 seconds).

In step 3150, a determination is made as to whether or not the upper burst timer has elapsed. If Yes, then the process flow goes to step 3160, whereby the upper air burst solenoid is closed to stop the upper air burst. If No, the process flow loops back to the start of step 3150 (this determination is made periodically, such as every 10 milliseconds).

In step 3170, a determination is made as to whether or not the lower burst timer has elapsed. If Yes, then the process flow goes to step 3180, whereby the lower air burst solenoid is closed to stop the lower air burst, and whereby a continuous backwash normal operation delay timer is started (default 2 minutes, min 10 seconds, max 5 minutes). If No, the process flow loops back to the start of step 3170 (this determination is made periodically, such as every 10 milliseconds).

In step 3190, a determination is made as to whether or not the continuous backwash normal operation delay timer has elapsed. If No, the process flow loops back to the start of step 3190 (this determination is made periodically, such as every 10 seconds). If Yes, the process flow proceeds to step 3200.

In step 3200, a determination is made as to whether or not filter media movement has been detected. By way of example and not by way of limitation, the filter media movement is detected by an ultrasonic level transmitter located directly above the reject weir. If Yes, then the process flow proceeds to step 3210. If No, then the process flow proceeds to step 3220. In step 3220, a burst counter value is incremented by one. In step 3230, a check is made as to whether or not the burst counter value has reached a set point (default 6, min 3, max 10). If Yes, then a continuous backwash filter airlift alarm is output in step 3240, to inform an administrator that the airlift process has failed to clean the water treatment system appropriately. If No, then the process flow proceeds to step 3250, to restart the burst sequence. In step 3250, the upper burst solenoid is opened, the upper burst timer is started (default 2.5 seconds, min 1 second, max 10 seconds), the lower burst delay timer is started (default 2 seconds, min 1 second, max 10 seconds), and the backwash timer is started. After step 3250, the process flow proceeds back to step 3110.

By setting the burst counter value to a predetermined set point value, such as 6, when the airlift stops functioning (when it should be doing so), the dual-burst airlift operation will be repeated up to a maximum of 5 more times (default 6 total cycles, min 3 cycles, max 10 cycles). If the airlift is still not functioning normally (as determined based on signals provided by the sensor 255 positioned directly over the weir 117 of the reject section 116 as shown in FIG. 2, whereby the sensor 255 may correspond to an ultrasonic level transmitter in one possible implementation), an alarm will be output (in step 3240), to thereby inform an operator or administrator of the failure, and that further corrective action is required.

In step 3210, a check is made as to whether or not the backwash timer has elapsed. If Yes, the process flow proceeds to step 3260, and if No, the process flow proceeds to step 3270. In step 3270, the burst counter is zeroed-out, and the process flow then proceeds to step 3200. In step 3260, a check is made as to whether or not the headloss exceeds the maximum headloss set point value for more than a predetermined time amount (e.g., 1 minute, min 5 seconds, max 2 minutes). By way of example and not by way of limitation, the headloss may be measured by a pressure transducer provided on the feed input path. If the headloss exceeds the maximum headloss set value, then the process flow proceeds to step 3265, whereby an alarm is output to inform a user that the headloss exceeds the maximum headloss value, and then the process flow proceeds to step 3270, in which the burst counter is zeroed-out, and then the process flow proceeds back to step 3200. If the headloss does not exceed the maximum headloss set value for more than the predetermined time amount, then the process flow proceeds to step 3280, to stop the backwash sequence. In step 3280, the normal operation solenoid is closed, and a reject stop delay timer is started (default 2 minutes, min 3 seconds, max 5 minutes).

In step 3285, a determination is made as to whether or not the reject stop delay timer has elapsed. If No, the process flow loops back to the start of step 3285 (this determination is made periodically, such as every 10 milliseconds). If Yes, the process flow proceeds to step 3290, to close the reject valve.

In step 3290, the reject value is closed, and a max timer between filtration is started (default 12 hours, min 30 minutes, max 48 hrs). In step 3295, a determination is made as to whether or not the headloss exceeds the maximum headloss set point value. If Yes, the process flow proceeds back to step 3130. If No, the process flow proceeds to step 3300, in which a determination is made as to whether or not the max timer between filtration has elapsed. If the determination in step 3300 is No, the process flow proceeds back to step 3295. If the determination in step 3300 is Yes, the process flow proceeds to step 3110.

The default values (e.g., timer values and count values) for the variables described above are for an exemplary implementation of this embodiment, whereby one of ordinary skill in the art will recognize that other values may be envisioned for these variables, while remaining within the spirit and scope of the invention.

The control unit 202' may be constituted by a microcomputer comprising a central processing unit (CPU), a read-only memory (ROM), a random access memory (RAM), an input/output interface (I/O interface), a counter, and one or more timers. Alternatively or additionally, the controller may be constituted by a plurality of microcomputers. The control unit 202' comprises the necessary hardware and/or software to carry out its functions disclosed herein. For example, the software may be stored on a tangible memory device, such as a DVD or a CD-ROM, which is accessible by the control unit 202'.

The above-disclosed system and computer-implemented method provides immediate automatic detection and correction to failed airlifts in the filtering bed in a granular media filter so as to maintain continuous and reliable airlift operation. Also, such immediate and automatic detection and correction may significantly reduce the required vigilance and labor which is currently required by on-site personnel.

As a result of utilizing dual airlifts in combination with intermittent operation of the airlifts, various improvements over conventional systems can be achieved, such as: a) reduced compressed air flow, b) reduced wear and tear on the air compressor system, c) reduced wear and tear on the airlifts, d) reduced electrical/energy consumption, e) improved filtrate quality, and f) reduced chemical consumption and cost.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A non-transitory computer readable medium storing a computer program product for facilitating a backwash process in a granular media filter including filter media and a water treatment tank, the computer program, when executed by a computer processor, causes the computer processor to perform the following functions:
   a) determining whether movement of the filter media is detected in the water treatment tank during a backwash process, and if not, performing the following functions:
      a1) instructing an upper burst solenoid to provide a burst of airlift flow emerging from a first airlift path at a first position in the filter media at a bottom portion of the water treatment tank, and at a first point in time; and
      a2) instructing a lower burst solenoid to provide a burst of airlift flow emerging from a second airlift path at a second position in the filter media at the bottom portion of the water treatment tank, and at a second point in time,
   wherein the second position is below the first position and the second point in time is after the first point in time, and
   wherein the bursts of airlift flow emerging from the first and second airlift paths enable suitable movement of the filter media within the water treatment tank thus facilitating the backwash process.

2. The non-transitory computer readable medium according to claim 1, further comprising the step of:
   a3) receiving a sensor signal that indicates a headloss value based on water flowing in a feed line,
   wherein, if the headloss value is less than a predetermined headloss value, stopping the backwash process.

3. The non-transitory computer readable medium according to claim 1, wherein the determining step is determined by receiving a sensor signal that indicates that a water level in a reject section is greater than a predetermined level.

4. The non-transitory computer readable medium according to claim 2, further causing the computer to perform the following functions:
   a4) setting a burst counter to zero;
   a5) receiving a sensor signal that indicates whether the movement of the filter media occurs above a predetermined amount of movement in the water treatment tank, and if not, performing the following functions:
      a51) incrementing the burst counter; and
      a52) checking whether or not the burst counter exceeds a burst counter preset value, and if no, performing steps a1) and a2), and if yes, outputting an alarm to indicate a problem with the backwash process in reducing the reject rate.

5. The non-transitory computer readable medium according to claim 1, wherein the bursts of airlift flow emerging from the first and second airlift paths overlap in time by an overlapping predetermined amount of time.

6. The non-transitory computer readable medium according to claim 2, wherein, if the headloss value is less than the predetermined headloss value, further causing the computer to perform the following functions:
   a4) instructing to stop gas flow for the backwash process; and
   a5) instructing a reject valve provided on a reject line to close.

7. The non-transitory computer readable medium according to claim 1, wherein the step a1) of instructing the upper burst solenoid to provide the burst of airlift flow emerging from the first airlift path is accomplished by signaling the upper burst solenoid to allow air flow thus resulting in air flowing upwards from a lower portion to an upper portion within the water treatment tank.

8. The non-transitory computer readable medium according to claim 1, wherein the step a2) of instructing the lower burst solenoid to provide the burst of airlift flow emerging from the second airlift path is accomplished by signaling the lower burst solenoid to allow air flow thus resulting in air flowing upwards from a lower portion to an upper portion within the water treatment tank.

9. The non-transitory computer readable medium according to claim 1, further causing the computer to perform the following functions:
   a12) instructing the upper burst solenoid to close thereby ending the burst of airlift flow emerging from the first airlift path; and
   a22) instructing the lower burst solenoid to close thereby ending the burst of airlift flow emerging from the second airlift path.

10. A method of facilitating reduction of a reject rate associated with a granular media filter including filter media and a water treatment tank, comprising:
   a) determining whether movement of the filter media is detected in the water treatment tank during a backwash process, and if not performing the following functions:
      a1) providing a burst of airlift flow at a first position in the filter media at a bottom portion of the water treatment tank, and at a first point in time; and
      a2) providing a burst of airlift flow at a second position in the filter media at the bottom portion of the water treatment tank, and at a second point in time,
   wherein the second position is below the first position and the second point in time is after the first point in time, and
   wherein the bursts of airlift flow at the first and second positions enable suitable movement of the filter media within the water treatment tank during the backwash process.

11. The method according to claim 10, further comprising:
a3) determining a headloss value based on water flowing in a feed line, wherein, if the headloss value is less than a predetermined headloss value, stopping the backwash process.

12. The method according to claim 10, wherein the determining step is determined by receiving a first sensor signal that indicates that a water level in a reject section is greater than a predetermined level.

13. The method according to claim 11, further comprising:
a4) setting a burst counter to zero;
a5) determining whether the movement of the filter media occurs above a predetermined amount of movement in the water treatment tank, and if not, performing the following functions:
　a51) incrementing the burst counter; and
　a52) checking whether or not the burst counter exceeds a burst counter preset value, and if no, performing steps a1) and a2), and if yes, outputting an alarm to indicate a problem with the backwash process in reducing the reject rate.

14. The method according to claim 10, wherein the bursts of airlift flow at the first and second positions overlap in time by an overlapping predetermined amount of time.

15. The method according to claim 11, wherein, if the headloss value is less than the predetermined headloss value, the method further comprises:
a4) stopping gas flow for the backwash process; and
a5) closing a reject valve provided on a reject line.

16. The method according to claim 10, wherein the step a1) of providing the burst of airlift flow at the first position is accomplished by signaling an upper burst solenoid to allow air flow thus resulting in air flowing upwards from a lower portion to an upper portion within the water treatment tank.

17. The method according to claim 10, wherein the step a2) of starting the burst of airlift flow at the second position accomplished by signaling a lower burst solenoid to allow air flow thus resulting in air flowing upwards from a lower portion to an upper portion within the water treatment tank.

18. The method according to claim 10, further comprising:
a12) ending the burst of airlift flow at the first position; and
a22) ending the burst of airlift flow at the second position.

\* \* \* \* \*